United States Patent
Kamimura

(10) Patent No.: US 7,027,775 B2
(45) Date of Patent: Apr. 11, 2006

(54) METHOD OF AUTOMATIC FREQUENCY-SETTING FOR WIRELESS MICROPHONE-RECEIVERS

(75) Inventor: Fumio Kamimura, Machida (JP)

(73) Assignee: Kabushiki Kaisha Audio-Technica, Tokyo (JP)

( * ) Notice: Subject to any disclaimer, the term of this patent is extended or adjusted under 35 U.S.C. 154(b) by 496 days.

(21) Appl. No.: 10/289,018

(22) Filed: Nov. 6, 2002

(65) Prior Publication Data

US 2003/0157916 A1 Aug. 21, 2003

(30) Foreign Application Priority Data

Feb. 15, 2002 (JP) .............................. 2002-038232

(51) Int. Cl.
*H04B 1/00* (2006.01)

(52) U.S. Cl. ..................... 455/71; 455/184.1; 455/337; 381/94.3

(58) Field of Classification Search ............... 455/63.1, 455/63.3, 67.1, 67.13, 71, 73, 75, 184.1, 455/185.1, 500, 501, 63.13, 313, 323, 337; 381/92, 94.1, 94.3
See application file for complete search history.

(56) References Cited

U.S. PATENT DOCUMENTS

| 5,058,170 | A | * | 10/1991 | Kanamori et al. | ............ 381/92 |
| 5,463,694 | A | * | 10/1995 | Bradley et al. | ................ 381/92 |
| 5,715,319 | A | * | 2/1998 | Chu | ............................. 381/26 |
| 6,032,045 | A | * | 2/2000 | Mimura | ...................... 455/446 |
| 6,069,961 | A | * | 5/2000 | Nakazawa | .................... 381/92 |
| 2001/0016046 | A1 | * | 8/2001 | Ohta | ............................ 381/98 |
| 2002/0097681 | A1 | * | 7/2002 | Treister et al. | .............. 370/238 |

FOREIGN PATENT DOCUMENTS

JP 2002-078037 3/2002

\* cited by examiner

*Primary Examiner*—Nguyen T. Vo
*Assistant Examiner*—Nhan T. Le
(74) *Attorney, Agent, or Firm*—Welsh & Katz, Ltd.

(57) ABSTRACT

The present invention relates to a method of automatically setting each of frequencies in each of a plurality of wireless microphone-receivers simultaneously used in the same area, based on the combinations of simultaneously usable frequencies. Each of microphone-receivers 10A to 10N is mutual-communicatably connected by a connecting cable CA. One and the other microphone-receivers are designated as a master microphone-receiver 10A and slave microphone-receivers 10B to 10N, respectively. First, an empty channel-information is sent from the master microphone-receiver 10A to a first slave microphone-receiver 10B and the frequency of the empty channel-information is set in the first slave microphone-receiver 10B. The empty channel-information is renewed in the master microphone-receiver. In the same manner frequencies except interfering radio waves are set in number order to the other slave microphone-receivers following the first slave microphone-receiver by mutually communicating with the master microphone-receiver.

8 Claims, 3 Drawing Sheets

FIG. 2

| FREQUENCY (MHz) | GROUP NUMBER |
|---|---|
| 806.125 | 1 |
| 806.250 | 2 |
| 806.375 | 1 |
| 806.500 | 2 |
| 806.625 | 3 |
| 806.750 | 4 |
| 806.875 | 3 |
| 807.000 | 2 |
| 807.125 | 1 |
| 807.250 | 6 |
| 807.375 | 3 |
| 807.500 | 4 |
| 807.625 | 5 |
| 807.750 | 1 |
| 807.875 | 2 |
| 808.000 | 4 |
| 808.125 | 5 |
| 808.250 | 3 |
| 808.375 | 5 |
| 808.500 | 2 |
| 808.625 | 3 |
| 808.750 | 5 |
| 808.875 | 2 |
| 809.000 | 1 |
| 809.125 | 4 |
| 809.250 | 3 |
| 809.375 | 4 |
| 809.500 | 1 |
| 809.625 | 5 |
| 809.750 | 4 |

| FREQUENCY (MHz) | GROUP NUMBER |
|---|---|
| 806.125 | 1 |
| 806.375 | 1 |
| 807.125 | 1 |
| 807.750 | 1 |
| 809.000 | 1 |
| 809.500 | 1 |
| 806.250 | 2 |
| 806.500 | 2 |
| 807.000 | 2 |
| 807.875 | 2 |
| 808.500 | 2 |
| 808.875 | 2 |
| 806.625 | 3 |
| 806.875 | 3 |
| 807.375 | 3 |
| 808.250 | 3 |
| 808.625 | 3 |
| 809.250 | 3 |
| 806.750 | 4 |
| 807.500 | 4 |
| 808.000 | 4 |
| 809.125 | 4 |
| 809.375 | 4 |
| 809.750 | 4 |
| 807.625 | 5 |
| 808.125 | 5 |
| 808.375 | 5 |
| 808.750 | 5 |
| 809.625 | 5 |
| 807.250 | 6 |

T2

METHOD OF AUTOMATIC FREQUENCY-SETTING FOR WIRELESS MICROPHONE-RECEIVERS

FIELD OF THE INVENTION

This present invention relates to a method of automatic frequency-setting for wireless microphone-receivers and, more particularly, to a method of automatic frequency-setting by connecting a plurality of the microphone-receivers to enable to mutually communicate therewith for setting a limited number of frequencies in the microphone-receivers one by one, in which the frequency-setting starts with a special master microphone-receiver and succeeds to each of slave microphone-receivers.

BACKGROUND OF THE INVENTION

A wireless microphone and a microphone-receiver are generally used as a pair of one microphone and one microphone-receiver. Therefore, for example, when a plurality of wireless microphones are simultaneously used at the outdoor concert, the microphone-receivers are prepared as many as a number of the microphones, so that each of used frequencies(channels) is allocated to each of the microphones and the microphone-receivers.

Since a wireless microphone utilizes a radio wave as a communication medium, when a plurality of wireless microphones are simultaneously used in the same area, each of different frequencies should be allocated to each of the microphones and microphone-receivers so as not to cause the mutual modulation-interference(mutual interference).

For example, according to the electric wave-law of Japan, the usable frequency bands for the B type wireless microphones are restricted to thirty (30) channels, into which the frequencies from 806.125 MHz to 809.750 MHz are divided for the particular wireless apparatuses with small electric power in the manner that the frequency-interval between each of adjacent channels is arithmetically equivalent to 0.125 MHz. Each of the different frequencies, which is selected from these limited number of the channels, should be allocated to each of microphone-receivers so as not to cause the mutual modulation-interference.

Since the mutual modulation-interference is caused by the harmonics of radio waves, the combinations of the frequencies which may be used so as not to cause the mutual modulation-interference are grouped by a simulation in advance, and the grouped frequencies are listed on a table. With reference to the table, each of the frequencies is hand-operatedly set in each of microphone-receivers on-site.

When grouping the frequencies, the simulation takes account of interfering radio waves, as well as the frequencies so adjacent as not to be removed by an electric filter of the microphone-receiver and two frequencies inputted into a super-heterodyne microphone-receiver, of which the difference corresponds to the intermediate frequency, and the like.

However, since the frequencies in each of the groups are not always lined in arithmetic order, it is not easy to read the frequencies. This is one of the reasons why wrong frequencies tend to be set in the wireless microphone-receivers, and a great number of the microphone-receivers takes much time to set frequencies.

In the country such as the United States of America, the wireless microphone system is applied by utilizing empty channels of TV. In this case the combinations of the frequencies which may be simultaneously used are incomparably greater in number than in Japan, so that it is considerably a big job to set each of the frequencies in each of the microphone-receivers with reference to the combinations of the table.

Further, even if the channels are set in the microphone-receivers, each time, the existence of the interfering radio waves should be checked by the electric field-intensity-meter such as a RF level meter provided in each microphone-receiver. when especially used on the concert tours, since the state of the other communication systems or the interfering radio waves is different at each of places, it will be happened that the channels should be re-set in the microphone-receivers at each place.

SUMMARY OF THE INVENTION

The subject of the present invention provides a method of automatic frequency-setting for wireless microphone-receivers, which may automatically set each of frequencies in each of the microphone-receivers based on the combinations of simultaneously usable frequencies.

In order to solve the above subject, when a plurality of wireless microphones are simultaneously used in the same area, in an automatic frequency-setting-method of wireless microphone-receivers for setting each of different frequencies in each of wireless microphones and microphone-receivers corresponding to each of the wireless microphones, respectively, each of the microphone-receivers is provided with a control means having a function for setting a frequency in a demodulation means, and a frequency table. In the frequency table a given range of frequencies is divided into groups, each of which includes frequencies that cause no radio wave interference such as the mutual modulation-interference. One specific microphone-receiver and the other microphone-receivers are designated as a master microphone-receiver and slave microphone-receivers, respectively, and each of the microphone-receivers is mutual-communicatably connected by a connecting cable. First, once one frequency selected from a given group in the frequency table is set in the demodulation means of the master microphone-receiver, an empty channel(frequency)-information except the frequency set in the master microphone-receiver is sent to a control means of a first slave microphone-receiver from the control means of the master microphone-receiver. Whereby, with reference to the empty channel-information, the control means of the first slave microphone-receiver selects one of the frequencies remained in the given group and sets the same in the demodulation means of the first slave microphone-receiver, while the control means of the first slave microphone-receiver sends the frequency information set in the first slave microphone-receiver to the control means of the master microphone-receiver. Next, the control means of the master microphone-receiver sends a newly empty channel-information except the frequency set in the first slave microphone-receiver to a second slave microphone-receiver. With reference to the newly empty channel-information, a control means of the second slave microphone-receiver selects one of the frequencies remained in the given group and sets the same in the control means of the second slave microphone-receiver while the control means of the second slave receiver sends the frequency information set in the second slave microphone-receiver to the control means of the master microphone-receiver. It is described above that the frequencies in the given group are set in the first and second slave microphone-receivers, respectively. The present invention is characterized that these steps are repeated in the same manner up to the terminal slave microphone-receiver N so that each of the frequencies in the given group is set in each of the microphone-receivers.

According to the present invention, each of the frequencies are selected from the combinations of frequencies which cause no mutual modulation-interference and automatically set in each of the microphone-receivers. The frequency-setting begins with the master microphone-receiver and succeeds to the first slave microphone-receiver, the second slave microphone-receiver, and finally up to the Nth slave microphone-receiver one by one. The frequencies which have been set in the microphone-receivers are concentratedly-maintained in the master microphone-receiver. Further in the present invention, the existence of the interfering radio wave is automatically judged together with setting frequencies in the microphone-receivers. That is, when the control means sets a frequency to the demodulation means, the control means judges the existence of the interfering radio wave. When the electric field-intensity of the output signal from the demodulation means exceeds a given value, the control means recognizes the existence of the interfering radio wave and selects another frequency.

This information of the interfering radio wave is also sent to the control means of the master microphone-receiver so that the control means of the master microphone-receiver excludes the frequency in which the existence of the interfering radio wave is recognized, from the empty channel-information. Since in the slave microphone-receivers these frequencies in which the interference radio wave has existed may not be selected, it will save time to set the frequencies.

A display means may be connected to the control means of the master microphone-receiver, so that the information such as the frequencies set in each of the microphone-receivers or an error message generated when any frequency has not been set in the microphone-receivers, may be indicated on the display means. It is preferred that the display function of a personal computer is utilized as the display means.

In order to designate one of a plurality of the microphone-receivers as the master microphone-receiver, when each of the microphone-receivers is sequentially connected by a connecting cable, it is preferred that the microphone-receiver which is connected with no upstream microphone-receiver is self-recognized as the master microphone-receiver. For example, this may be realized by the hardware specification of the interface.

According to a preferred specific form of the present invention, the master microphone-receiver selects a group having grater number of the channels than that of the slave microphone-receivers in order to allocate each of the frequencies to the each microphone-receiver.

In another specific form of the invention, it may be possible that the frequency table is provided only in the master microphone-receiver and the master microphone-receiver allocates each of the frequencies to each of the slave microphone-receivers one by one, while the master microphone-receiver confirms the existence of the interfering radio wave to the slave microphone-receivers.

In the above case, after the frequency(channel) data is sent from the master microphone-receiver to the each slave microphone-receiver and the frequency is set in the each slave microphone-receiver, the interfering radio wave in the frequency is checked and the result is sent to the master microphone-receiver. These processes are performed in order between the master microphone-receiver and each of the slave microphone-receivers.

BRIEF DESCRIPTION OF THE DRAWINGS

FIG. 2 is an explanatory view of a frequency table on which frequencies stored in a memory of each microphone-receivers are lined in order of a frequency.

FIG. 3 is an explanatory view of the frequency table on which frequencies stored in the memory of each microphone-receivers are lined in order of the group number.

DETAILED DESCRIPTION OF THE PREFERRED EMBODIMENTS

Figure 1:
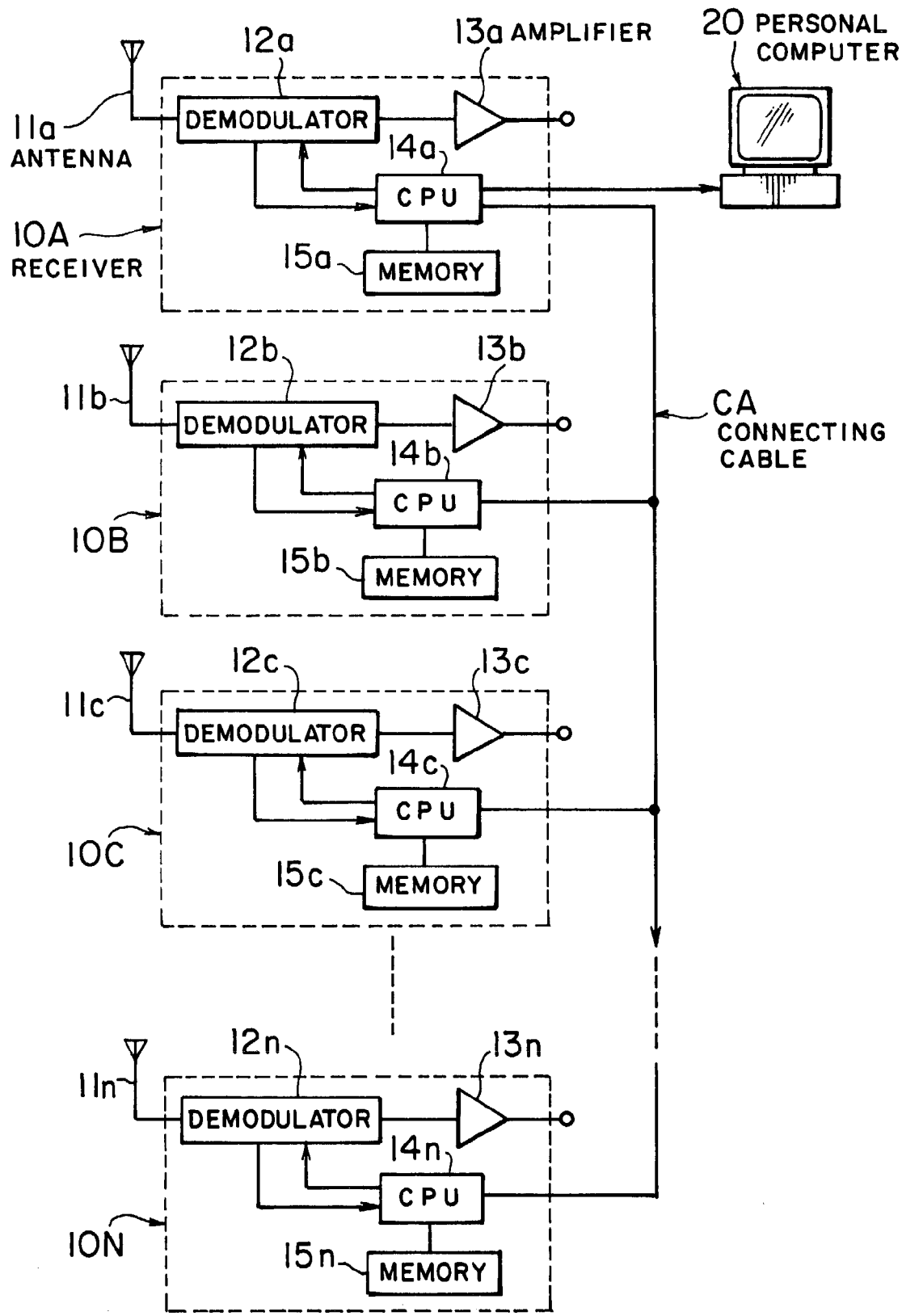
FIG. 1 is a schematic view showing the state of connecting each microphone-receivers related to an embodiment of the present invention.

As shown in FIG. 1, providing that the number of microphone-receivers is N, in which N is any number, microphone-receivers 10A to 10N are mutual-communicatably connected by a connecting cable CA. The communication system of the above mutually-communicatable connecting may employ either a serial or a parallel data communication, which are conventionally used.

As the basic structure, each of the microphone-receivers 10A to 10N is provided with a demodulator 12 which demodulates a radio wave received through an antenna 11 from a wireless microphone (not shown), and an amplifier 13 amplifying and outputting the demodulated audio signal. Further, each of the microphone-receivers 10A to 10N is provided with a CPU(central processing unit) 14 functioning as a control means in order to enable to automatically set a frequency, and a memory 15 in which a frequency table is stored. The control means may be a micro-computer.

When the above components which are provided in the microphone-receivers 10A to 10N need to be individually described, as shown in FIG. 1, an alphabetic small letter corresponding to the alphabetic capital letter of the end of the reference numerals and symbols of the microphone-receiver is appended to the reference numerals of the component.

The CPU 14 of each of the microphone-receivers 10A to 10N has, at least, the function of setting a frequency in the demodulator 12, and the function of judging the existence of the interfering radio wave by obtaining the demodulated output signal from the demodulator 12 and comparing the electric field-intensity thereof with a given value.

With reference to FIG. 2 and FIG. 3, the frequency table stored in the memory 15 will be described. In this embodiment, the thirty(30) channels, into which the frequencies between 806.125 MHz and 809.750 MHz of the particular wireless apparatuses with small electric power provided by the electric wave-law of Japan are arithmetical-equally divided by the unit of 0.125 MHz, are designated as the frequency bands used by the wireless microphones.

These thirty channels are simulated to check the occurrence of the radio wave interference such as the mutual modulation-interference in advance, and are grouped by the combinations of the frequencies which enable to be simultaneously used at the same area. A frequency table T1 illustrated in FIG. 2 shows the thirty channels lined up in order of a frequency. A frequency table T2 illustrated in FIG. 3 shows the thirty channels lined up in order of a group number. Since the contents of the frequency tables T1 and T2 are equal, it is sufficient that either the frequency table T1 or T2 is stored in the memory 15. The frequency table is stored in each of the memories 15 of all microphone-receivers.

According to the frequency table, for example, six channels of the frequencies of 806.125 MHz, 806.375 MHz, 807.125 MHz, 807.750 MHz, 809.000 MHz and 809,500 MHz are included in group 1.

As an example, the procedure of the automatic frequency-setting of the invention will be described, provided that six microphone-receivers 10A to 10F use group 1. First, one of the microphone-receivers and the other microphone-receivers are designated as a master microphone-receiver and slave microphone-receivers, respectively.

In this embodiment, when each microphone-receiver is sequentially connected by a connecting cable, the microphone-receiver that is connected with no upstream microphone-receiver is automatically recognized as the master microphone-receiver by the interface specification of the connecting cable.

That is, in this example, the microphone-receiver 10A is self-recognized as the master microphone-receiver and grasps the total number of the slave microphone-receivers. However, in place of the automatic recognition method, the information such as the designation of the master and slave microphone-receivers or the total number of the slave microphone-receivers, may be hand-operatedly set from an operation part which is not shown.

Then, the CPU 14a of the master receiver 10A is directed to select group 1 as a used group and set a frequency of group 1, for example, 806.125 MHz, as the channel(frequency) of the demodulator 12a.

Consequently, the CPU 14a selects 806.125 MHz of group 1 from the frequency table of the memory 15a and sets the same in the demodulator 12a. In this example, the frequency of the master microphone-receiver 10A is determined by a microphone user, however, the determination of the frequency may be left to the automatic selection of the CPU 14a.

After the frequency is set in the demodulator 12a, the CPU 14a obtains an output signal from the demodulator 12a and judges the existence of the interfering radio wave such as radio waves used in the other communication systems by comparing the electric field-intensity of the output signal with the preset threshold.

After the CPU 14a of the master microphone-receiver 10A recognizes no interfering radio wave, the CPU 14a sends an empty channel-information of group 1 to a CPU 14b of a first slave microphone-receiver 10B. The empty channel-information is the information of the remained five channels except 806.125 MHz which has been set in the master microphone-receiver 10A.

With reference to the empty channel-information, the CPU 14b of the first slave microphone-receiver 10B selects a frequency of group 1, for example, 806.375 MHz and sets the same in the demodulator 12b. Then the CPU 14b of the first slave microphone-receiver 10B judges the existence of the interfering radio wave, and after the CPU 14b of the first slave microphone-receiver 10B recognizes no interfering radio wave, the CPU 14b of the first slave microphone-receiver 10B sends the information that the CPU 14b of the first slave microphone-receiver 10B has set 806.375 MHz, to the CPU 14a of the master microphone-receiver 10A.

Then the CPU 14a of the master microphone-receiver 10A sends the empty channel-information of the remained four channels except 806.375 MHz further excluded from group 1, to a CPU 14c of a second slave microphone-receiver 10C. Consequently, as the same way as done in the first slave microphone-receiver 10B, the CPU 14c of the second slave microphone-receiver 10C selects one of the remained frequencies of group 1 from the frequency table of the memory 15c and sets the same in the demodulator 12c of the second slave microphone-receiver 10C. The CPU 14c of the second slave microphone-receiver 10C sends the information of the set frequency to the CPU 14a of the master microphone-receiver 10A after the CPU 14c recognizes no interfering radio wave.

As the same manner described above, with regard to a third slave microphone-receiver 10D, a fourth slave microphone-receiver 10E and a fifth slave microphone-receiver 10F, each of the frequencies included of group 1 is respectively set to each of the demodulators 12d to 12f one by one.

In this embodiment, a personal computer 20 is connected to the master microphone-receiver 10A when the frequency-settings of all of the microphone-receivers 10A to 10F are completed, the CPU 14a sends the frequency-setting-data to the personal computer 20 and indicates the information such as the microphone-receiver numbers and the set frequencies of the microphone-receivers on the display of the personal computer 20. With reference to the indications, a microphone user sets each of the transmitting frequencies to each of the wireless microphones, respectively.

However, when it is recognized that the interfering radio wave exists in any microphone-receiver, for example, providing that the interfering radio wave is recognized in the frequency of the second slave microphone-receiver 10C, the CPU 14c of the second slave microphone-receiver 10C selects another frequency in group 1 and sets the same in the demodulator 12c. The CPU 14c of the second slave microphone-receiver 10C sends the frequency information in which the interfering radio wave has been recognized together with another frequency information set in the second slave microphone-receiver 10C to the CPU 14a of the master microphone-receiver 10A.

Consequently, the CPU 14a of the master microphone-receiver 10A excludes the frequency of the recognized interfering radio wave from the empty channel-information sending to the CPU 14d of the third slave microphone-receiver 10D. In this example, the total number of the microphone-receivers are six, so that, when the frequency of the recognized interfering radio wave is excluded, one frequency may not be set in one of the microphone-receivers because of the shortage of the one channel.

As described above, when the number of the channels is shorter than that of the microphone-receivers, the CPU 14a of the master microphone-receiver 10A indicates an error massage on the display of the personal computer 20. While, when the group in which the number of the channels is shorter than that of the microphone-receivers is selected, the error massage is also indicated on the display.

When the shortage of the number of the channels causes an error, the CPU 14a of the master microphone-receiver 10A may search another group in which the number of the channels is greater than that of the microphone-receivers and set each of the channels of another group in each of the microphone-receivers, respectively.

In the embodiment described above, the microphone user determines the used group. However, a group in which the number of the channels is greater than that of the slave microphone-receivers may be automatically selected by the master microphone-receiver.

In another embodiment, the frequency table is provided only in the master microphone-receiver and the master microphone-receiver allocates each of the frequencies to each of the slave microphone-receivers one by one, while the master microphone-receiver confirms the existence of the interfering radio wave to the slave microphone-receivers. That is, the master microphone-receiver sends frequency (channel) data to each of the slave microphone-receivers and after the frequency is set in the demodulator of the slave microphone-receiver, the existence of the interfering radio wave is judged and the result is sent to the master microphone-receiver. In this manner, above-described processes are carried out for each slave microphone-receiver one by one, so that each of the frequencies is allocated to each of the microphone-receivers, respectively.

As described above, according to this invention, each of a plurality of wireless microphone-receivers which are simultaneously used in the same area is mutual-communicatably connected and one of the microphone-receivers and the other microphone-receiver are designated as the master microphone-receiver and the slave microphone-receivers, respectively. Once the master microphone-receiver sets the frequency thereto, the master microphone-receiver sends the empty channel-information except the frequency set thereto to the first slave microphone-receiver and then the usable frequency is set in the first slave microphone-receiver. The information of the set frequency in the first slave microphone-receiver is sent to the master microphone-receiver and the master microphone-receiver renews the empty channel-information. The processes of setting frequencies to the slave microphone-receivers after the second slave microphone-receiver are carried out in the same manner and each of the frequencies may be automatically set in each of the microphone-receivers, respectively, based on the combinations of the simultaneously usable frequencies by mutually communicating with the master microphone-receiver.

The invention claimed is:

1. An automatic frequency-setting-method of wireless microphone-receivers, in the simultaneous use of a plurality of wireless microphones in the same area, for setting each of different frequencies to each of wireless microphones and microphone-receivers corresponding to each of the wireless microphones, respectively, said method comprising the steps of:
   (a) providing a control means having a function for setting a frequency in a demodulation means and a frequency table, in each of the microphone-receivers, wherein in the frequency table, a given range of frequencies is divided into groups and each of the groups includes frequencies that cause no radio wave interference such as the mutual modulation interference;
   (b) designating one specific microphone-receiver and the other microphone-receivers as a master microphone-receiver and slave microphone-receivers, respectively, and mutual-communicatably connecting each of the microphone-receivers by a connecting cable;
   (c) setting one frequency selected from a given group of the frequency table in the demodulation means of the master microphone-receiver;
   (d) sending an empty channel (frequency) information except the frequency set in the master microphone-receiver from the control means of the master microphone-receiver to the control means of a first slave microphone-receiver after the frequency of the master microphone-receiver being set;
   (e) after the empty channel-information is sent to the control means of the first slave microphone-receiver, the control means of the first slave microphone-receiver selects one of the remained frequencies from the given group with reference to the empty channel-information and sets the same in the demodulation means of the first slave microphone-receiver; and
   (f) sending the frequency information set in the first slave microphone-receiver to the control means of the master microphone-receiver;
   (g) next, the control means of the master microphone-receiver sends the empty channel-information renewed by excluding the frequency set in the first microphone-receiver, to a control means of the second slave microphone-receiver, whereby the control means of the second slave microphone-receiver selects one of the remained frequencies in the given group with reference to the empty channel-information and sets the same in the demodulation means of the second slave microphone-receiver, while the information of the frequency set in the second slave microphone-receiver is sent to the control means of the master microphone receiver;
   (h) thereby setting each of the frequencies up to the demodulation means of the final slave microphone-receiver N by repeating the sending of the empty channel-information excluding the frequencies set in the slave microphone-receivers to each of the slave microphone-receivers, setting the same in the each of the slave microphone-receivers with reference to the empty channel-information, and sending the channel-information set in each of the slave microphone-receiver to the master receiver.

2. An automatic frequency-setting-method of wireless microphone-receivers according to claim 1, wherein, when the control means sets the frequency to the demodulation means, the control means recognizes the existence of an interfering radio wave and selects another frequency when the electric field-intensity of the output signal from the demodulation means is greater than a given value.

3. An automatic frequency-setting-method of wireless microphone-receivers according to claim 2, wherein the control means of the master microphone-receiver excludes the frequency of the interfering radio wave from the empty channel-information after the existence of the interfering radio wave is recognized.

4. An automatic frequency-setting-method of wireless microphone-receivers according to any one of claims 1 to 3, wherein the control means of the master microphone-receiver indicates the frequencies set in the microphone-receivers including that of the master microphone-receiver on a designated display means.

5. An automatic frequency-setting-method of wireless microphone-receivers according to claim 1, wherein the control means of the master microphone-receiver indicates an error message on the designated display means when no frequencies are set in all of the microphone-receivers.

6. An automatic frequency-setting-method of wireless microphone-receivers according to claim 1, wherein each of the microphone-receivers is sequentially connected by the connecting cable and the microphone-receiver which is connected with no upstream microphone-receiver is self-recognized as the master microphone-receiver.

7. An automatic frequency-setting-method of wireless microphone-receivers according to claim 1, wherein, when the master microphone-receiver allocates each of the frequencies to each of the microphone-receivers, the master microphone-receiver selects the group in which the number of the channels is greater than that of the slave microphone-receivers from the frequency table.

8. An automatic frequency-setting-method of wireless microphone-receivers, in the simultaneous use of a plurality of wireless microphones in the same area, for setting each of different frequencies to each of the wireless microphones and the microphone-receivers corresponding to each of the wireless microphones, respectively, each of the microphone-receivers including control means having a function for setting a frequency in demodulation means, one of the microphone-receivers and the other microphone-receivers designated as a master and slave microphone-receivers, respectively, the microphone-receivers mutual-communicatably connected to each other with a connecting cable, a frequency table provided only in the master microphone-receiver, frequencies in the frequency table divided into frequency groups of predetermined frequencies in the frequency table in consideration of mutual modulation-interference, the automatic frequency-setting-method comprising the steps of:

(a) transmitting an empty channel (frequency)-information except for a frequency set in the master microphone-receiver from the control means of the master microphone-receiver to control means of a first slave microphone-receiver, setting a frequency of said empty channel-information to a demodulator of the first slave microphone-receiver from the control means of the first slave microphone-receiver, checking interference radio waves in the frequency set in said demodulator and transmitting a result of checking said interference radio waves to the master microphone-receiver;

(b) transmitting an empty channel-information except for the frequency set in the first slave microphone-receiver from the control means of the master microphone-receiver to control means of a second slave microphone-receiver, setting a frequency of said empty channel-information to a demodulator of the second slave microphone-receiver from the control means of the second slave microphone-receiver, checking interference radio waves in the frequency set in said demodulator and transmitting a result of checking said interference radio waves to the master microphone-receiver; and (c) thereby setting each of the frequencies up to a demodulator of a final slave microphone-receiver N, by repeating the transmission of an empty channel-information except for a frequency set in each of the other slave microphone-receivers from the control means of the master microphone-receiver to control means of the each slave microphone-receiver, repeating the transmission of the frequency of the empty channel-information to the demodulator of the each slave microphone-receiver from the control means of each slave microphone-receiver, and repeating the check of each of the interference radio waves in the each frequency and the transmission of each result of checking each of the interference radio waves to the microphone-receiver.

* * * * *